INVENTOR.
WILLIAM J. DEGNEN

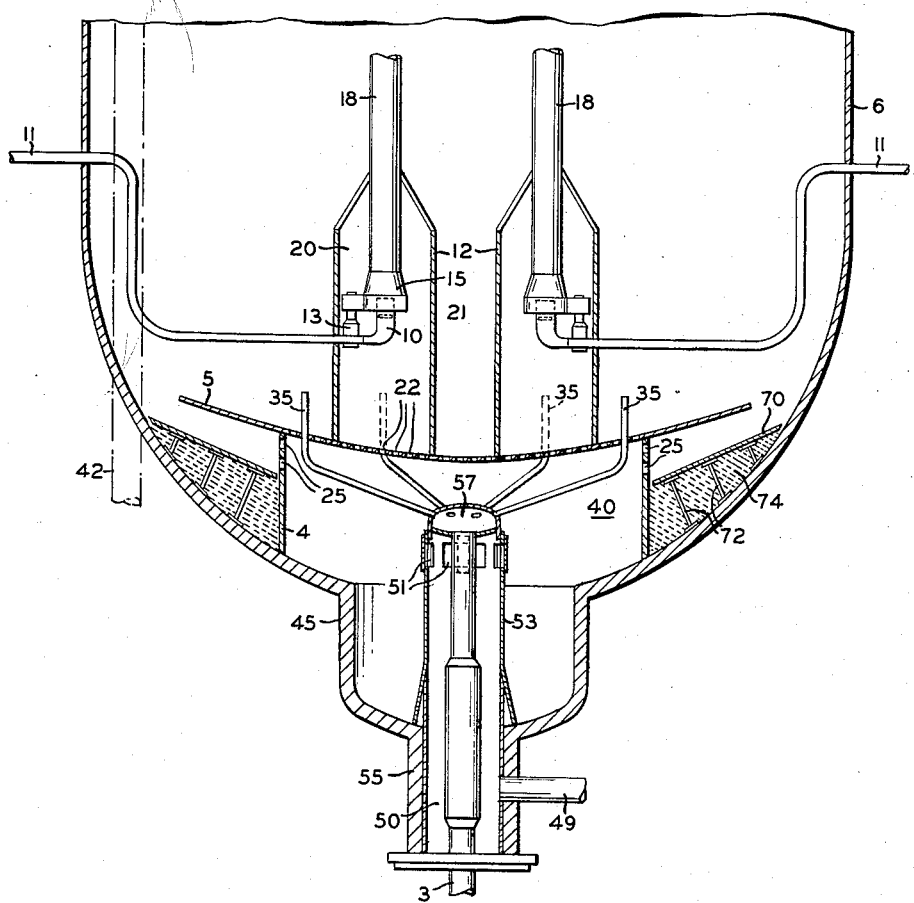
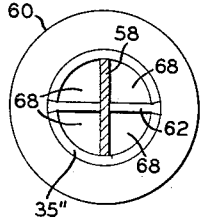
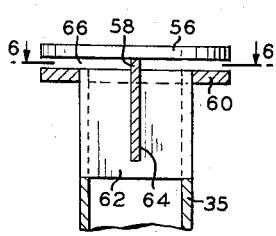
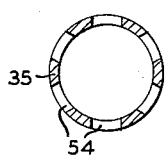
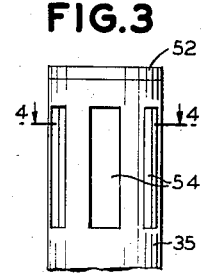
INVENTOR.
WILLIAM J. DEGNEN
ATTORNEYS Dec. 29, 1959 W. J. DEGNEN 2,919,243
METHOD AND MEANS FOR INTRODUCING A REACTANT VAPOR
TO A FLUIDIZED BED OF CONTACT MATERIAL
Filed Feb. 29, 1956 3 Sheets-Sheet 3

INVENTOR.
WILLIAM J. DEGNEN

BY
ATTORNEYS

United States Patent Office 2,919,243
Patented Dec. 29, 1959

1

2,919,243

METHOD AND MEANS FOR INTRODUCING A REACTANT VAPOR TO A FLUIDIZED BED OF CONTACT MATERIAL

William J. Degnen, Westfield, N.J., assignor to The M. W. Kellogg Company, Jersey City, N.J., a corporation of Delaware Application February 29, 1956, Serial No. 568,536

8 Claims. (Cl. 208—150)

This invention relates to an apparatus and conversion process employing finely divided fluidized contact material in a conversion zone. In one aspect, this invention relates to a method and apparatus for introducing a reactant gas into a fluidized bed of contact material. Although the invention is described with respect to a hydroforming process for the conversion of naphthas to cyclic compounds, in its broadest aspect the invention is applicable to any conversion process wherein a reactant is contacted with a fluidized bed of contact material.

It is known that catalytic hydroforming of petroleum naphthas with hydroforming catalysts such as molybdena-alumina in a single fluidized solid catalyst bed will upgrade and produce cyclic compounds of a higher octane rating under suitable operating conditions. Generally, the hydroforming of petroleum naphthas to produce cyclic compounds of a higher octane rating is carried out at a temperature of 875 to 1000° F. and a pressure of 50 to 500 p.s.i.g. The naphtha feed is preheated to a temperature below which thermal cracking of the feed takes place approximately 950° F. prior to entering the reactor, which imparts approximately 20 percent of the heat of the reaction, approximately 50 percent being furnished by the recycle gas and the circulating catalyst supplying approximately 30 percent of the heat in the reactor. The introduction of the hot feed and recycle gases under the required operating conditions to the fluidized catalyst bed has been attended by numerous difficulties such as nonuniformity of catalyst fluidization at the reactant inlet, a tendency of reactants to funnel through the catalyst bed and accumulation of defluidized catalyst around the reactant inlet with resultant build-up of excessive carbonaceous deposits on the catalyst. The present invention corrects these difficulties to a large extent by providing a method and apparatus for introducing the reactant vapors and recycle gases in such a manner that the catalyst bed is uniformly fluidized across its entire cross-sectional area at the reactant inlet.

An object of this invention is to provide an improved process and apparatus for introducing reactant vapors to the bottom of a fluidized bed of contact material.

A second object of this invention is to provide an improved method for hydroforming naphthas in the presence of finely divided fluidized contact material.

Another object of this invention is to prevent contaminated contact material from collecting around the reactant inlet.

Still another object of this invention is to prevent the reactant gases from funneling through the bed of contact material by maintaining the contact material fluidized at the reactant inlet.

A further object of this invention is to prevent carbonaceous material from collecting on the reactant inlet distributing means.

Yet another object of this invention is to maintain a uniform catalyst bed temperature at the reactant inlet.

Various other objects and advantages of the present invention will become apparent to those skilled in the art from the accompanying description and disclosure.

According to this invention, reactant vapors are introduced into the bottom of an enlarged and elongated vertical reaction zone and passed upwardly therethrough at an appropriate gas velocity of about 0.1 to about 5 feet per second to maintain a mass of finely divided contact material therein in a fluidized pseudo-liquid condition. In order to prevent defluidization of contact material along the sides of the reaction zone, the incoming reactant vapors are uniformly dispersed over the bottom cross-section of the reaction zone while simultaneously directing a portion of the reactant vapors from the inlet as a separate stream outwardly and upwardly along the sides of the reaction zone.

In one embodiment the invention relates to a reactant distributing device in the bottom of a vertical elongated reaction zone. The distributing device or apparatus comprises a cylindrical chamber perforated in its upper portion and capped with a larger diameter circular plate, which may be dish-shaped, flat or domed, which extends beyond the cylindrical wall of the chamber almost to the walls of the reaction zone thereby forming an annular space therebetween. That portion of the circular plate extending beyond the wall of said cylindrical chamber outwardly toward the walls of the reaction zone is an annular non-perforated or impervious area. The remaining area of the dish-shaped plate encompassed by the cylindrical walls of the distributing chamber is perforated to permit a portion of the reactant vapors to pass directly upwardly through the bed of contact material. Another portion of the reactant vapors introduced into said cylindrical distributing chamber passes outwardly through the perforations in the upper portion of the cylindrical wall and are directed outwardly and upwardly along the reactor walls by the impervious extension of the circular dish-shaped plate which caps the cylindrical chamber.

This method and apparatus for introducing reactants to the bottom of a fluidized bed of contact material prevents contact material from settling along the reactor walls and maintains the bed of contact material uniformly fluidized around the reactant inlet thereby preventing reactant vapors from channeling through the fluid bed of contact material. In addition, this method and apparatus for introducing reactants to the fluid bed of contact material prevents excessive build-up of carbonaceous deposits upon the contact material tending to defluidize around the reactant inlet as previously experienced because of the long residence time of the defluidized contact material in the reaction zone.

The present invention may be best understood and described by reference to the accompanying drawings which show the inventive features of the present invention as applied to the hydroforming of naphthas to produce cyclic compounds.

Figure 1 of the drawings is a diagrammatic illustration in elevation of an arrangement of apparatus for the hydroforming of naphthas.

Figure 2 is a cross-sectional view of one embodiment of distributing means of Figure 1 for introducing reactant vapors to a fluidized bed of finely divided contact material.

Figures 3, 4, 5 and 6 illustrate several types of nozzles for introducing reactants into the fluidized bed of contact material.

Figure 1:
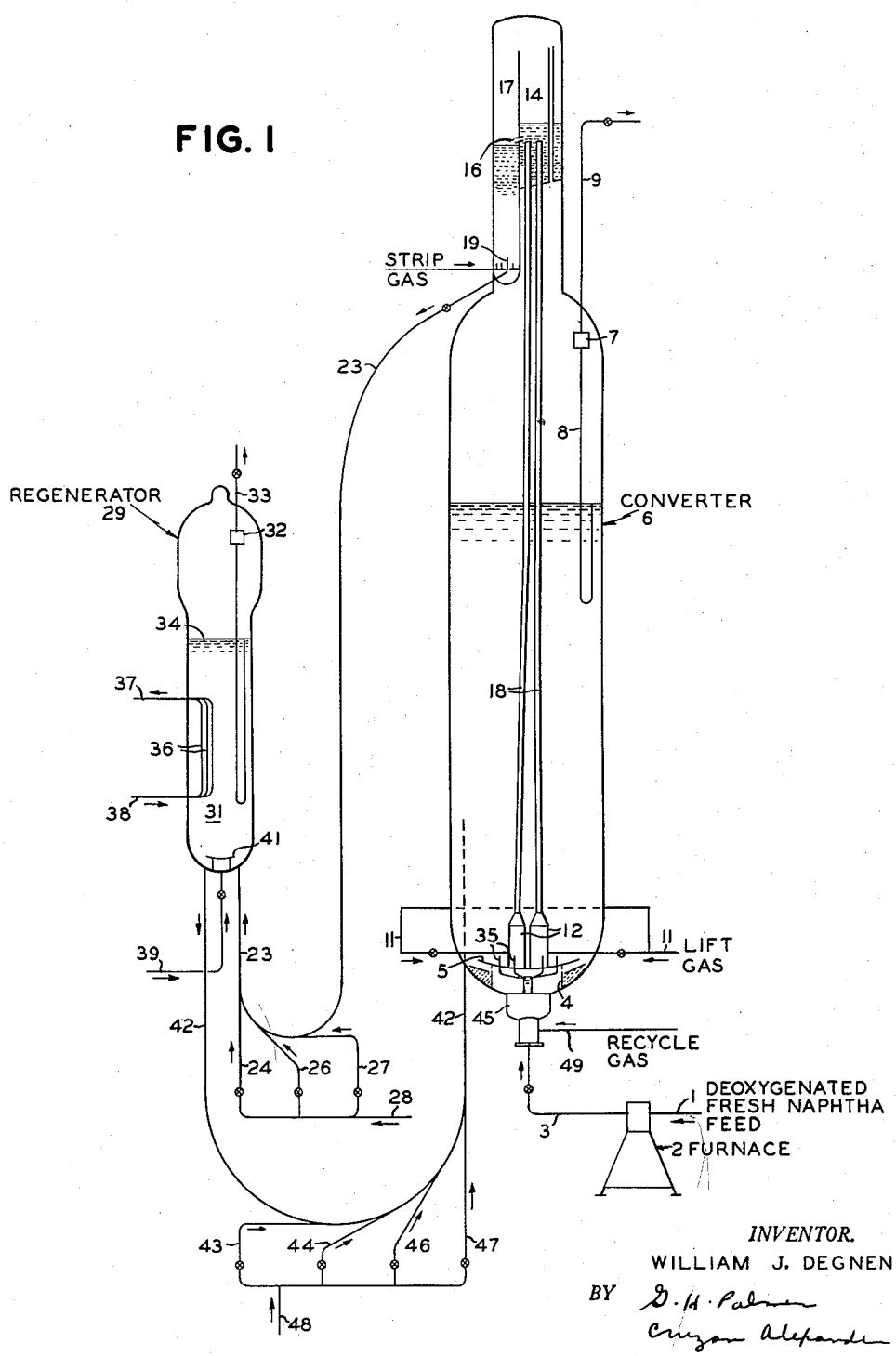

Referring to Figure 1, a desired fresh naphtha feed having a molecular weight of approximately 109.0 and a 55.0 API gravity is introduced through a conduit 1 of a conventional preheating furnace 2 wherein the naphtha is preheated to a temperature of approximately 1000° F. The preheated feed is then passed through a conduit 3 into the bottom of a vertically elongated cylindrical reaction zone 6 at a rate of about 190,640 pounds per hour to reactant distributing means 35 for introducing the preheated feed into a fluidized bed of hydroforming catalyst introduced to the bottom of reactor 6 through conduit 42. Preheated recycle gases at a temperature of approximately 1150° F. are introduced through conduit 49 to cylindrical chamber 50 connected to the bottom of and extending upwardly into chamber 45 which distributes recycle gases to chamber 40 through elongated slots or perforations 51, said distributing device more specifically described hereinafter, which distributes the recycle gases throughout the bottom of the fluidized bed of catalyst. A portion of these hot recycle gases pass through an annular zone of restricted cross-sectional area formed by a circular plate 5 which may be dish-shaped, flat or domed, outwardly and upwardly along the reactor wall 6 of the conversion zone. The hot recycle gases and preheated feed commingle in the dense fluidized contact material, in one embodiment shown by Figure 2, above the recycle gas distributing plate 5 and pass upwardly through a dense fluidized catalyst bed maintained thereabove for conversion into desirable reaction products. In the other embodiment shown by Figures 7 and 8, the hot recycle gases and preheated feed are commingled below the distributing plate before entering the fluidized bed of contact material above. The products of the reaction then pass into a more dilute catalyst phase above the dense catalyst phase into a plurality of cyclone separators such as separator 7 in which catalyst fines are removed from the reaction products and returned to the dense fluidized catalyst bed through dipleg 8. The reaction products having a molecular weight of approximately 19.9 and at a temperature of about 915° F. are then removed from the reaction zone through conduit 9 at a rate of approximately 170,000 pounds per hour and passed to a separation zone, not shown. A portion of the spent catalyst is transferred as a relatively dilute catalyst phase in lift lines or conduits 18 by lift gas such as recycle gas or super-heated steam, introduced through conduit 11 in the bottom of the reaction zone at a rate of approximately 7400 pounds per hour. The lift gas at a molecular weight of approximately 11.3 is preheated in a conventional preheating furnace, not shown, to a temperature of approximately 1100° F. The lift gas conveys the contaminated contact material from the bottom of the reaction zone 6 upwardly through lift lines or conduits 18 to an accumulation zone 14 superimposed thereabove the reaction zone wherein products of reaction and lift gas are separated from the catalyst and the catalyst settles as a relatively dense fluidized mass. The contact material, at a temperature of approximately 900° F. is then transferred to a stripping zone 17 adjacent to said accumulation zone through elongated openings 16 in the wall therebetween. The accumulation chamber and stripping chamber are in open communication with one another in the upper portion of said chambers and means are provided for transferring contact material from said accumulation chamber to said stripping chamber in the form of elongated slots or openings 16. Suitable stripping gases, which may be recycle gases or superheated steam, are introduced into the bottom of stripping zone 17 at a rate of approximately 9000 pounds per hour and at a temperature of 1100° F., which maintains the contact material therein in a dense fluidized condition to facilitate stripping of the occluded reaction products from the contact material. The upper part of the stripping and accumulator zones are in open communication with the upper part of the reaction zone thereby providing means for withdrawal of stripping gas and lift gas with reaction products through separator 7 and conduit 9. The stripped contact material is withdrawn from the stripping zone by withdrawal conduit 19 concentrically positioned in the lower portion of the stripping zone but above the stripping gas inlet means. The contact material is then transferred through conduit 23 to the vertically elongated regeneration zone 29. Steam or recycle gases may be introduced through conduits 28, 27, 26, and 24 to assist in transfer of the contact material in conduit 23 to regeneration zone 29. Contaminated contact material is removed from stripping zone 17 at a rate of approximately 192,000 pounds per hour. Regeneration gases are introduced into the bottom of vertical elongated regenerator 29 through conduit 39 into a regeneration gas distributing chamber 41 which may be similar in design to the distributing chamber described hereinafter for directing and distributing regeneration media uniformly throughout the bottom of the dense fluidized bed of contact material. Cooler 36 submerged in the dense fluidized bed of contact material in the regeneration zone 29, comprising coolant inlet conduit 38 and outlet conduit 37, provides means for controlling the reaction temperature within the desired range during combustion of carbonaceous deposits and other contaminants on the contact material. Regeneration gases containing controlled amounts of oxygen introduced through conduit 39 removes carbonaceous deposits from the contact material in the regeneration zone. The products of combustion are separated from the contact material in a dilute phase superimposed above the dense phase of contact material in the regeneration zone. The hot products of regeneration are then passed through cyclone separator 32 and removed from the regeneration zone 29 through conduit 33. The regenerated contact material is withdrawn from the bottom of the dense fluidized bed of contact material in the regeneration zone by conduit 42 at a rate of approximately 191,000 pounds per hour through conduit 42 and transferred to the bottom of reaction zone 6. Air or inert gas may be introduced through conduits 48, 43, 44, 46 and 47 to assist in transferring the regenerated contact material in conduit 42 to reaction zone 6.

According to one embodiment of the present invention, as shown by Figure 1, a unitary and integrated vessel is provided containing an accumulation zone and a stripping zone in the upper portion of the vessel of smaller diameter with the reaction zone in the lower portion thereof. The advantages of such a unitary vessel are manyfold, in that, it is simple and economical to manufacture by elimination of elaborate inter-connecting conduits and supporting structure, provides a system of minimum heat loss, and provides a system for transfer of fluidized contact material through a plurality of inter-connecting zones with a minimum of transfer equipment. Since the flow of the finely divided catalyst material throughout the several contacting zones is basically a function of the differential in pressure due to catalyst head, the unitary system of the present invention takes maximum advantage of this basic principle to transfer the catalyst from one zone to another. By reducing the head in the catalyst lift lines, with lift gas, for transferring the catalyst from the bottom of the reaction zone to the accumulation zone positioned above the reaction zone, a minimum of auxiliary equipment is required to maintain catalyst flow through a plurality of contact zones.

In accordance with the present invention, the essential features are more specifically defined by referring to Figure 2 which shows diagrammatically, in cross-section, the apparatus for introducing reactants into the bottom of a dense fluidized bed of contact material. Figure 2 shows the bottom portion of a vertically elongated cylindrical reaction zone 6 which is hemispherical at the bottom. A cylindrical chamber 50 closed at the bottom and formed by walls 53 and 55 extends vertically upward into chamber 40 located in the bottom of the reaction zone and formed, in part, by cylindrical wall 45 forming the lower part of the reaction zone and cylindrical wall 4 which is concentric with the vertical axis of vessel 6. Chamber 50 is perforated in the upper portion of its wall by elongated slots 51 around its periphery in a plane above the point of contact of the chamber walls with the reactor walls. An inlet conduit 49 is connected to the bottom of annular cylindrical chamber 50 and provides means for introducing recycle gas into the bottom of the reaction zone through chamber 50 containing slots 51 into chamber 40. The cylindrical chamber 40, confined by walls 4 and capped by an enlarged circular plate 5 which may be flat, domed or dish-shaped as shown is concentric with the vertical axis and extends upwardly from the bottom of the reactor wall 6 to form a second distributing chamber around said cylindrical chamber 50. The cylindrical wall 4, forming chamber 40, is provided around its circumference by perforations 25 in its upper portion. The cylindrical wall 4, forming chamber 40, is capped with an enlarged circular dish-shaped plate 5 which extends almost to the walls of the cylindrical reactor 6 to form an annular space therebetween. The dish-shaped plate 5 is perforated in the circular area between the point of contact of the cylindrical wall 4 with the dish-shaped plate 5 and the dish-shaped plate 5 is non-perforated in the annular area extending upwardly and outwardly beyond the periphery of the cylindrical wall 4. Positioned below the annular non-perforated portion of said dish-shaped plate 5 is a second annular impervious plate 70 adjacent to the hemispherical bottom of the cylindrical reactor 6 which is so positioned above the bottom of the reactor but below the perforations in the upper portion of cylindrical wall 4 to form an annular zone between the non-perforated section of dish-shaped plate 5 and the annular plate 70 positioned adjacent to the bottom of the reactor 6. Annular plate 70 may be replaced by any suitable built-up, reinforced refractory surface which will form an annular zone as described above. This annular zone provides means for directing a portion of the recycle gases introduced through conduit 49, chamber 50 and chamber 40 to be directed outwardly and upwardly along the reactor walls 6. The annular space below annular plate 70 in this embodiment is filled with a refractory material 74 which will be uneffected by the heat of the reaction zone. This material should be of such a nature that it can be easily removed from a reaction zone for repairs. Annular plate 70 is connected or fastened to the walls of reactor 6 with studs 72 or other suitable means known in the art. Conduit 3 extends vertically and upwardly through chamber 50 and terminates in zone 57 to which is attached a plurality of conduit means 35 which then pass outwardly and upwardly through the perforated section of dish-shaped plate 5 into the reaction zone thereabove providing a plurality of nozzles in a circular arrangement above perforated plate 5 forming the top of distributing chamber 40. Positioned above, and attached to dish-shaped plate 5, is a plurality of chambers or wells 20 formed by cylindrical walls 12. The bottom of the chamber 20 is in open communication with distributing chamber 40 by a plurality of perforations 22 which provides means for recycle gas to pass from chamber 40 into the lower portion of chamber 20 for the purpose of maintaining contact material therein in a fluidized condition. A vertically elongated conduit 18 extends downwardly into the open-end of cylindrical well 20 somewhat below its upper periphery which may terminate as a straight section or as a conical expanded section 15, as shown. A plurality of rods forming a cone with elongated slots therebetween, commonly referred to as a "bird-cage," is connected to the upper periphery of the cylindrical walls 12 and the periphery of vertical conduit 18 to form a grid which will prevent large particles or agglomerates of contact material from falling into chamber 20 therebelow. A conduit 11 which extends through the reactor wall 6 terminates in an expanded cylindrical L shaped nozzle 10 pointing directly upward and extending partially 6 to 12 inches into the bottom of vertical conduit 18 concentric therewith to form an annular zone between nozzle 10 and conduit 18. Spent contact material in the reaction chamber 6 is withdrawn downwardly through the "bird-cage" atop well or chamber 20 to the bottom thereof and transferred upwardly through vertical conduit 18 by lift gas introduced through conduit 11 at a velocity sufficient to transport the contact material vertically upward through conduit 18 to chamber 14. A portion of the recycle gases introduced through conduit 49 to chamber 50 and chamber 40 pass upwardly through perforations 22 into the bottom of well 20 to maintain the contact material therein in a relatively dense fluidized condition.

Figures 3 and 4 show one embodiment of a nozzle arrangement suitable for introducing reactants to the catalyst bed from conduits 35. Conduits 35, containing cap 52, is provided with a plurality of elongated slots 54 located at a substantial distance below cap 52 (9"–18") which distribute the reactant vapors outwardly into the fluidized bed of contact material.

Figures 5 and 6 show another embodiment of a nozzle arrangement which comprises a disc 56 with vertical plate or web 58 attached to a second vertical plate or web 62 which in turn is attached to pipe 35 and provides for an annular distributor 66 for dispersing reactant vapors uniformly into the fluidized bed of contact material. In the second embodiment, a portion of conduit 35, below annular plate 60, is sectionalized into zones 68 by plates 58 and 62 to provide a more uniformed distribution of the reactants to the annular chamber 66.

Figure 7:
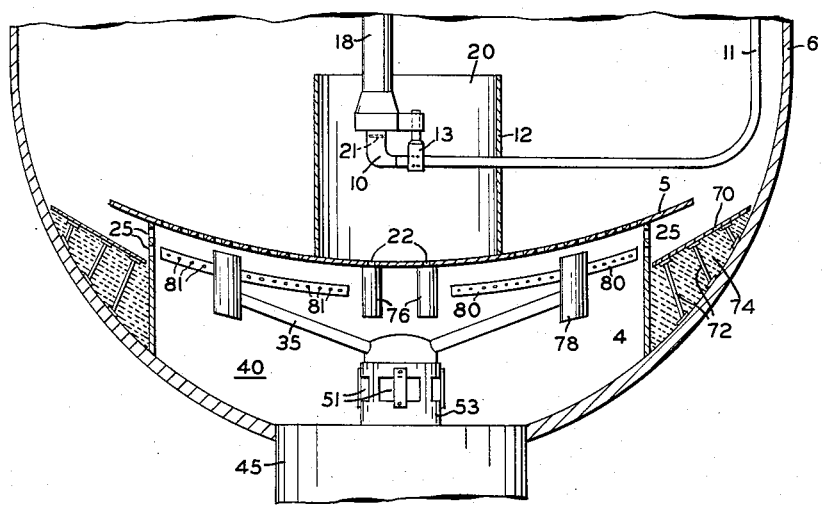
Figure 7 is a cross-sectional view of another embodiment of distributing means of Figure 1 for introducing reactant vapors to a fluidized bed of finely divided contact material.

Figure 7 shows another embodiment of the present invention for introducing reactants at the bottom of a fluidized bed of contact material. The reactants are introduced to the bottom of the reaction chamber 6 similar to that described in reference to Figure 2 except that the hydrocarbon feed is commingled with the recycle gases in chamber 40 below perforated plate 5 prior to passing through the perforations 22 in the dish-shaped plate 5 or perforations 25 in walls 4 of the chamber 40. More specifically, the hydrocarbon feed introduced through conduit 3, which terminates in chamber 57, pass outwardly through a plurality of conduits 35 to a nozzle arrangement formed by chamber 78 containing conduit 80 with perforations 81. The recycle gases introduced by conduit 49 to chamber 50 pass upwardly to outlets 51 into chamber 40 and commingle with the hydrocarbon feed ejected through perforations 81 beneath the distributor plate 5. In order to prevent the commingled reactants from passing upwardly through well 20 confined by walls 12, a plurality of open-end conduits 76 extend downwardly into chamber 40 from plate 5. A portion of the recycle gases pass upwardly through conduit 76 and perforations 22 into the bottom of well 20 to maintain finely divided contact material therein in a fluidized condition. The commingled hydrocarbon feed and recycle gases in the upper portion of chamber 40 above inlets to conduits 76 pass upwardly through perforations 22 in plate 5 outside the vertical walls of well 20 into the fluidized bed of contact material thereabove. A portion of these commingled reactants pass outwardly through perforations 25 in wall 4 through an annular zone as described above outwardly and upwardly along the walls of the reaction zone. Contact material withdrawn from the dense fluidized bed downwardly through the upper part of well 20 is conveyed upwardly through conduit 18 by lift gases introduced by conduit 11 containing grid 21 in nozzle 10 as previously described. The upper periphery of well 20 may be provided with a "bird-cage" similar to that described in Figure 2 for preventing large particles or agglomerates from settling into the chamber. Grid 21 in nozzle 10 reduces the tendency of contact material from falling downward into the nozzle and eroding the wall of the lift gas nozzle.

Figure 8:
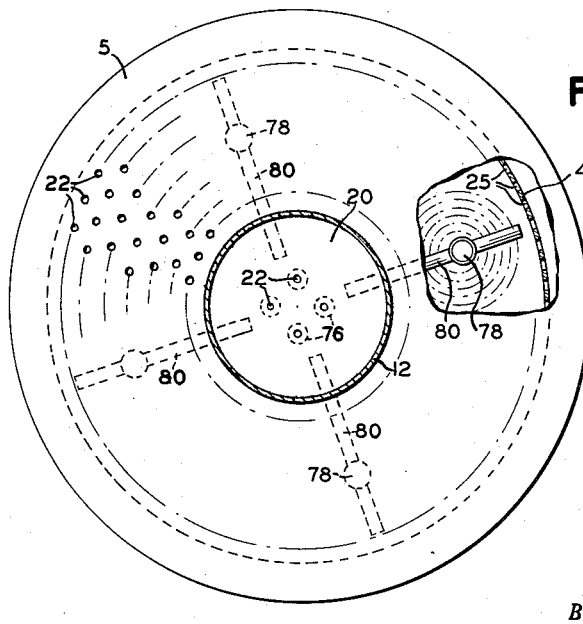
Figure 8 is a plan view of distributing means of Figure 7.

Figure 8 is a plan view of the reactant distributing means of Figure 7 which shows the cylindrical zone or well 20 formed by walls 12 containing in the bottom thereof perforations 22 which provides means for recycle gases to pass upwardly from chamber 40 through conduits 76 and perforations 22 into the bottom of chamber 20. The annular portion of the plate 5 between cylindrical walls 12 and the junction of cylindrical wall 4 with dish-shaped plate 5 is provided with a plurality of perforations 22. The commingled reactants in this embodiment pass upwardly through perforations 22 into the contact material thereabove as previously described.

This particular method and apparatus for introducing reactants into the bottom of a fluidized bed of contact material provides a means for uniform fluidization of the contact material about the reactant inlet and therefore a more uniform temperature distribution in the catalyst bed. Furthermore, this method of introducing reactants to the bed of contact material prevents excessive build-up of carbonaceous deposits on the reactant inlet distributing means and the fluidized catalyst around the reactant inlet. In addition, this method of introducing reactant vapors to the bed of contact material prevents the contact material from defluidizing at the reactant inlet and prevents the reactants from channeling through the bed of contact material. This method and apparatus for introducing reactants to a fluid bed of contact material is adaptable to any system employing fluidized contact material. Furthermore, this method and apparatus for introducing reactants to the bottom of a fluidized bed of contact material circumvents the problems associated with non-uniformity of temperatures around the reactant inlet thereby controlling to a large degree undesirable detrimental side reactions previously experienced in the art. Although this invention has been described more particularly in connection with hydroforming of naphthas, it is to be understood that it is particularly adaptable to apparatus for conducting any reaction using a fluidized contact material.

EXAMPLE 1

The basic design of a fluid hydroformer was set by the over-all requirement for a high quality aviation gasoline blending stock. In order to produce the required aviation blending material, it was necessary to reform a select, narrow boiling range (224–272°F.) naphtha at a high severity. Run I with the fluid hydroformer was continued for 42 days. Although acceptable products were made during most of this period, the operation of the unit was considered generally unsatisfactory. Inspection of the unit after shutdown revealed that about ten tons of hard black deposit (analysis showed as high as 90 percent carbon) was found in the form of a layer around the outer edge of the reactor grid. To circumvent this problem, improved recycle gas distribution was provided, as shown by Figure 2, at the outer edge of the grid to prevent stagnation in the zone where the coke deposit had formed. This modification provided additional advantages to the extent that it prevented the catalyst from defluidizing at the reactor walls and provided a more uniform temperature throughout the catalyst bed at the reactant inlet with lessening of the attendant hydrocracking on the stagnant zone which results in a considerable rise in temperature due to exothermic reactions. Run II was started and continued with excellent success. As the carbon and sulfur content of the catalyst was lowered to reasonable levels, attributed to good catalyst circulation, the effective activity of the catalyst improved. After 120 days of operation, the difficulties experienced in run I had been eliminated, and aviation gasoline of the desired octane rating was continuously produced.

*Table I*

|  | Operating Conditions—Run II | | | | |
|---|---|---|---|---|---|
| No. Days | 8 | 15 | 15 | 15 | 6 |
| Feed rate, b.p.d. | 17,570 | 17,790 | 18,300 | 18,880 | 18,550 |
| Reactor Temp., °F | 918 | 920 | 911 | 908 | 906 |
| Cat. to Oil Ratio | 0.87 | 0.75 | 0.84 | 0.74 | 0.77 |
| Space Velocity, W./Hr./W | 0.34 | 0.35 | 0.34 | 0.35 | 0.33 |
| Reactor Pressure, p.s.i.g. | 225 | 225 | 225 | 225 | 225 |
| $C_5$—Hydroformate Oct., F-1 (clear) | 93.4 | 92.2 | 92.0 | 90.9 | 90.6 |
| Recycle Gas, s.c.f./B | 5,480 | 5,410 | 5,330 | 5,160 | 5,160 |
| Mol. Percent $H_2$ | 67.5 | 64.0 | 66.1 | 66.6 | 66.2 |
| Rec. Gas Furnace Out, °F | 1,154 | 1,171 | 1,157 | 1,152 | 1,148 |
| Naphtha Furnace Out, °F | 961 | 962 | 951 | 947 | 936 |
| Carbon on Cat., Wt. Percent: | | | | | |
|    Spent | 0.59 | 0.70 | 0.66 | 0.74 | 0.71 |
|    Regenerated | 0.02 | 0.03 | 0.04 | 0.06 | 0.05 |
| Sulfur on Spent Cat., Wt. Percent | 0.05 | 0.07 | 0.07 | 0.10 | 0.04 |
| Reactor Bed Height, Ft.[1] | 46.5 | 45.0 | 46.0 | 44.5 | 45.5 |
| Catalyst Holdup, M lbs.: | | | | | |
|    Reactor | 571.0 | 563.0 | 594.0 | 592.0 | 616.0 |
|    Regenerator | 10.3 | 11.9 | 9.8 | 10.0 | 16.4 |
|    Total [2] | 601.3 | 594.9 | 623.8 | 622.0 | 652.4 |
| Reactor Density, #/Ft.[3] | 43 | 44 | 46 | 47 | 48 |
| Regenerator Holdup Time, Min. | 3.68 | 4.89 | 3.48 | 3.89 | 6.23 |
| Cat. Circulation, #/hr | 168,000 | 146,000 | 169,000 | 154,000 | 158,000 |
| Regen. Temp., °F | 1,097 | 1,109 | 1,084 | 1,107 | 1,102 |
| Combustion Air, #/hr | 21,900 | 21,960 | 22,540 | 22,210 | 22,610 |
| Regen. Density, #/Ft.[3] | 22 | 18 | 19 | 19 | 25 |

[1] Feet above grid.
[2] 20,000# Catalyst in lines, stripper and hopper (est.).

It is intended that all matter contained in the above detailed description or shown in the accompanying drawings shall be interpreted as illustrative and not in a limiting sense. Various modifications and alterations of the process and arrangement of apparatus of this invention may become apparent to those skilled in the art without departing from the scope of this invention. The theories and specific examples are offered as a means for better understanding of the invention and are not to be construed as unnecessarily limiting to the invention.

Having described my invention, I claim:

1. In a hydrocarbon conversion process the improved method of operation which comprises introducing recycle gases into the bottom of a hydrocarbon conversion zone beneath a bed of finely divided catalyst maintained therein, passing a portion of a recycle gas stream upwardly through and uniformly distributed across the catalyst bed under conditions to maintain said catalyst bed in a fluidized condition, directing another portion of said recycle gases outwardly and upwardly along the walls of said conversion zone whereby defluidization of catalyst at the bottom of the bed adjacent to the walls of the conversion zone is prevented, introducing a hydrocarbon reactant into the lower portion of said fluidized catalyst bed for upward flow therein under conversion conditions to convert said hydrocarbon reactant into desired products thereby contaminating the catalyst, withdrawing conversion products from the upper portion of said conversion zone, withdrawing contaminated catalyst from said fluidized bed of catalyst above the point of introduction of said hydrocarbon reactant for passage downwardly through a stripping zone countercurrent to a portion of the recycle gas introduced to the bottom of said conversion zone and withdrawing catalyst from the lower portion of the stripping zone for further treatment in the process.

2. In a hydrocarbon conversion process the improvement which comprises maintaining a fluidized bed of catalyst in a reaction zone by introducing a fluidizing gas into the bottom of said catalyst bed such that a portion of said fluidizing gas is directed outwardly and upwardly along the walls of said reaction zone to prevent defluidization of catalyst in the lower portion thereof adjacent to the walls of said reaction zone, introducing a hydrocarbon reactant directly into the lower portion of said fluidized bed of catalyst above the point of introduction of said fluidizing gas, effecting conversion of said introduced hydrocarbon reactant into desired products, thereby contaminating the catalyst with products of reaction, withdrawing products of reaction from the upper portion of said reaction zone, withdrawing contaminated catalyst from said fluid bed of catalyst and passing the same downwardly through a stripping zone countercurrent to a portion of the fluidizing gas introduced to the bottom of said reaction zone and thereafter withdrawing catalyst from the lower portion of said stripping zone for further treatment in the process.

3. A hydrocarbon conversion process which comprises passing a fluidizing gas comprising recycle gas into the bottom of a reaction zone containing a bed of finely divided catalytic material, maintaining said bed of finely divided catalyst in a fluidized condition by passing a portion of said gas upwardly through a perforated partition extending across the bottom of said reaction zone, said partition forming an annular space with the wall of said reaction zone, passing another portion of said fluidizing gas outwardly and upwardly through said annular space to prevent defluidization of catalyst along the lower wall of said reaction zone, introducing a hydrocarbon reactant to said fluid catalyst bed for upward passage therethrough under conversion conditions, thereby contaminating the catalyst, withdrawing contaminated catalyst from the lower portion of said fluid catalyst bed above the point of introduction of said hydrocarbon reactant, passing the withdrawn contaminated catalyst downwardly through a stripping zone countercurrent to a portion of the fluidizing gas introduced to the bottom of said reaction zone and withdrawing catalyst from the lower portion of the stripping zone for further treatment in the process.

4. An apparatus for contacting a reactant with a dense fluidized mass of finely divided contact material comprising an elongated vertical reaction chamber, means for introducing finely divided contact material into said reaction chamber, a perforated distributing chamber positioned in the lower portion of said reaction chamber, means for introducing a fluidizing gas to said perforated distributing chamber, means for deflecting a portion of said fluidizing gas in the distributing chamber as an annular stream outwardly and upwardly along the wall of said reaction chamber, means for introducing a reactant material into the fluidized bed of contact material at a point above said distributing chamber, a settling chamber positioned above said reaction chamber, conduit means for transferring finely divided contact material from the lower portion of said reaction chamber, but above the distributing chamber to said settling chamber, a stripping chamber positioned adjacent to said settling chamber, means for transferring contact material from the settling chamber to said stripping chamber and means for withdrawing finely divided contact material from the stripping chamber.

5. An apparatus comprising in combination a reaction chamber, means for introducing finely divided contact material into said reaction chamber, said reaction chamber adapted to contain a dense fluidized bed of finely divided contact material, means for introducing a fluidizing gas to a distributing chamber positioned in the bottom of said reaction chamber, said distributing chamber adapted to deflect a portion of said fluidizing gas as an annular stream outwardly and upwardly along the wall of said reaction chamber, a first stripping chamber open at its upper end extending upwardly from said distributing chamber, means for passing a portion of said fluidizing gas from said distributing chamber upwardly into said first stripping chamber, means for introducing a reactant material into the fluidized bed of contact material above said distributing chamber, a settling chamber superimposed above said reaction chamber, means for transferring finely divided contact material from the lower portion of the reaction chamber into said first stripping chamber, means for passing contact material from the lower portion of said first stripping chamber upwardly into said settling chamber, means for separating finely divided contact material as a dense fluidizing mass of contact material in said settling chamber, a second stripping chamber positioned adjacent to said settling chamber, means for transferring contact material from said settling chamber to said second stripping chamber and means for withdrawing finely divided contact material from the bottom of said second stripping chamber.

6. An apparatus for contacting a reactant with a fluidized mass of finely divided solid contact material comprising in combination a substantially vertical reaction chamber adapted to contain a fluidized bed of finely divided contact material therein, a distributing chamber positioned in the bottom of said reaction chamber, said distributing chamber formed in the upper portion thereof by a perforated dish-shaped plate and adapted in the upper portion thereof deflect fluidizing gas introduced thereto as an annular stream outwardly and upwardly along the wall of said reaction chamber, conduit means for introducing a reactant material to the fluidized bed of contact material in the reaction chamber, a settling chamber superimposed above said reaction chamber, conduit means for transferring finely divided contact material from the lower portion of the fluidized bed of contact material but above said reactant inlet means to said settling chamber, means for separating finely divided contact material in said settling chamber, means for transferring contact material from said settling chamber to a stripping chamber adjacent thereto and superimposed above said reaction chamber and means for returning finely divided contact material to said reaction chamber.

7. An apparatus comprising in combination a vertical cylindrical reaction vessel hemispherical in shape in the bottom thereof, a first confined cylindrical chamber extending into the bottom of said reaction vessel, said cylindrical chamber containing a plurality of slots in the upper portion of its periphery, a second chamber positioned in the bottom of said vessel and surrounding the upper portion of said first chamber, said second chamber formed in the upper portion thereof by a vertical cylindrical section extending upwardly from the hemispherical bottom of said reaction vessel and perforated in the upper periphery thereof, said second chamber capped by a dish-shaped plate which extends substantially to the walls of said reaction vessel to provide an open annular space therewith, said dish-shaped plate perforated in the area confined by said cylindrical walls of said second chamber and nonperforated in the annular area extending beyond said cylindrical walls, an annular member positioned below the extended portion of the dish-shaped plate to form an annular chamber above the bottom of the reaction vessel and in open communication with the upper perforated portion of said second chamber, a first conduit extending vertically upward through said first chamber to the upper portion of said second chamber, said first conduit terminating in a plurality of conduits in said second chamber which extend outwardly and upwardly along the inside wall of said second chamber and through said dish-shaped plate, a third cylindrical chamber open at each end attached to and positioned above said dish-shaped plate, a second conduit extending through the reactor vessel walls to the center of said third cylindrical chamber above said perforated plate, said second conduit terminating in an expanded open end L-shaped conduit extending vertically upward and positioned concentrically within said third chamber, and a substantially vertical conduit extending downward into said third chamber terminating in an expanded cylindrical section which surrounds the upper end of said L-shaped conduit.

8. An apparatus comprising in combination a vertical cylindrical reaction vessel, a first cylindrical chamber extending upwardly into the bottom of said reaction vessel, said cylindrical chamber perforated in its upper periphery, a second chamber surrounding the upper portion of said first cylindrical chamber, said second chamber formed by a vertical cylindrical section extending upwardly from the bottom of said reaction vessel and perforated near its uppermost edge, said second chamber capped by a circular plate which extends substantially to the walls of said reaction vessel to provide an annular space therewith, said circular plate perforated in the area confined by said circular portion of said second chamber and nonperforated in the annular area extending beyond said cylindrical walls, an annular section positioned below the extended portion of the nonperforated plate to form an annular chamber in communication with the perforated wall of said second chamber, said annular section extending from the cylindrical walls of said second chamber to the walls of said reaction vessel, a first conduit extending through said first chamber into said second chamber, said first conduit divided into a plurality of conduits in said second chamber which extend through the perforated area of said circular plate and terminate thereabove as open end feed nozzles, a third open end cylindrical chamber extending above the perforated area of said plate, a second conduit extending into said third cylindrical chamber above said perforated plate, said second conduit open at its upper end and extending vertically upward within the lower portion of said third chamber, a third conduit extending downwardly into said third chamber, and said third conduit terminating at a point below the upper end of said second conduit and surrounding the upper end thereof.

References Cited in the file of this patent
UNITED STATES PATENTS

| | | |
|---|---|---|
| 2,506,307 | Martin | May 2, 1950 |
| 2,694,672 | MacLaren | Nov. 16, 1954 |
| 2,761,769 | Elder | Sept. 4, 1956 |
| 2,761,820 | Snuggs et al. | Sept. 4, 1956 |
| 2,765,263 | Fritz et al. | Oct. 2, 1956 |
| 2,791,542 | Nathan | May 7, 1957 |
| 2,799,359 | Johnson | July 16, 1957 |